(12) United States Patent
Moreels et al.

(10) Patent No.: US 9,762,689 B2
(45) Date of Patent: *Sep. 12, 2017

(54) IMPLICIT GEOLOCATION OF SOCIAL NETWORKING USERS

(71) Applicant: Facebook, Inc., Menlo Park, CA (US)

(72) Inventors: Pierre Moreels, San Jose, CA (US); Mukund Narasimhan, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,895

(22) Filed: Jan. 12, 2015

(65) Prior Publication Data

US 2015/0127744 A1    May 7, 2015

Related U.S. Application Data

(63) Continuation of application No. 13/588,956, filed on Aug. 17, 2012, now Pat. No. 8,972,570.

(51) Int. Cl.

| | |
|---|---|
| *G06F 15/16* | (2006.01) |
| *H04L 29/08* | (2006.01) |
| *G06Q 50/00* | (2012.01) |
| *G06Q 10/08* | (2012.01) |
| *G06Q 30/02* | (2012.01) |

(52) U.S. Cl.
CPC ......... *H04L 67/22* (2013.01); *G06Q 10/0833* (2013.01); *G06Q 30/0261* (2013.01); *G06Q 50/01* (2013.01); *H04L 67/18* (2013.01)

(58) Field of Classification Search
CPC ............................ H04L 12/2818; H04L 43/08
See application file for complete search history.

(56) References Cited

U.S. PATENT DOCUMENTS

| | | | | |
|---|---|---|---|---|
| 2007/0156804 A1* | 7/2007 | Mo | ........................ | H04W 8/02 709/200 |
| 2007/0230399 A1* | 10/2007 | Oswal | ............... | H04W 36/0033 370/331 |
| 2009/0068992 A1* | 3/2009 | Takehara | ................ | H04W 4/02 455/412.1 |
| 2009/0195655 A1* | 8/2009 | Pandey | ............ | G08B 13/19647 348/158 |
| 2010/0330991 A1* | 12/2010 | Sydir | ................. | G01C 21/3461 455/436 |
| 2011/0061605 A1* | 3/2011 | Hardi | ................... | A01K 15/021 119/721 |

(Continued)

*Primary Examiner* — Arvin Eskandarnia
(74) *Attorney, Agent, or Firm* — Baker Botts L.L.P.

(57) ABSTRACT

In one embodiment, one or more computing systems receive a request for a location prediction for a user from a service. The computing systems access one or more real-time location signals and one or more aggregated location signals. The aggregated location signals may comprise one or more previous location signals. The computing systems may then generate one or more location predictions from the one or more real-time location signals and the one or more aggregated location signals, and calculate a single location prediction for the user from the one or more location predictions. The computing systems may then send, in response to the request, the single location prediction for the user to the requesting service.

23 Claims, 9 Drawing Sheets

(56) References Cited

U.S. PATENT DOCUMENTS

| | | | |
|---|---|---|---|
| 2011/0237255 A1* | 9/2011 | Furukawa | H04B 7/15535 455/436 |
| 2013/0132194 A1* | 5/2013 | Rajaram | G06Q 50/01 705/14.52 |
| 2013/0217427 A1* | 8/2013 | Bajko | H04W 48/14 455/507 |
| 2013/0290414 A1* | 10/2013 | Rait | G06Q 50/01 709/204 |

* cited by examiner

IMPLICIT GEOLOCATION OF SOCIAL NETWORKING USERS

PRIORITY

This application is a continuation under 35 U.S.C. §120 of U.S. patent application Ser. No. 13/588,956, filed 17 Aug. 2012.

TECHNICAL FIELD

This disclosure generally relates to social networking.

BACKGROUND

A social networking system, such as a social networking website, enables its users to interact with it and with each other through the system. The social networking system may create and store a record, often referred to as a user profile, in connection with a user. The user profile may include a user's demographic information, communication channel information, and personal interests. The social networking system may also create and store a record of a user's relationships with other users in the social networking system (e.g., via a social graph), as well as provide services (e.g., wall-posts, photo-sharing, or instant messaging services) to facilitate social interaction between users in the social networking system. A geo-social networking system is a social networking system in which geographic services and capabilities are used to enable additional social interactions. User-submitted location data or geo-location techniques (e.g., mobile phone position reporting) can allow a geo-social network to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

DESCRIPTION OF EXAMPLE EMBODIMENTS

Figure 1:
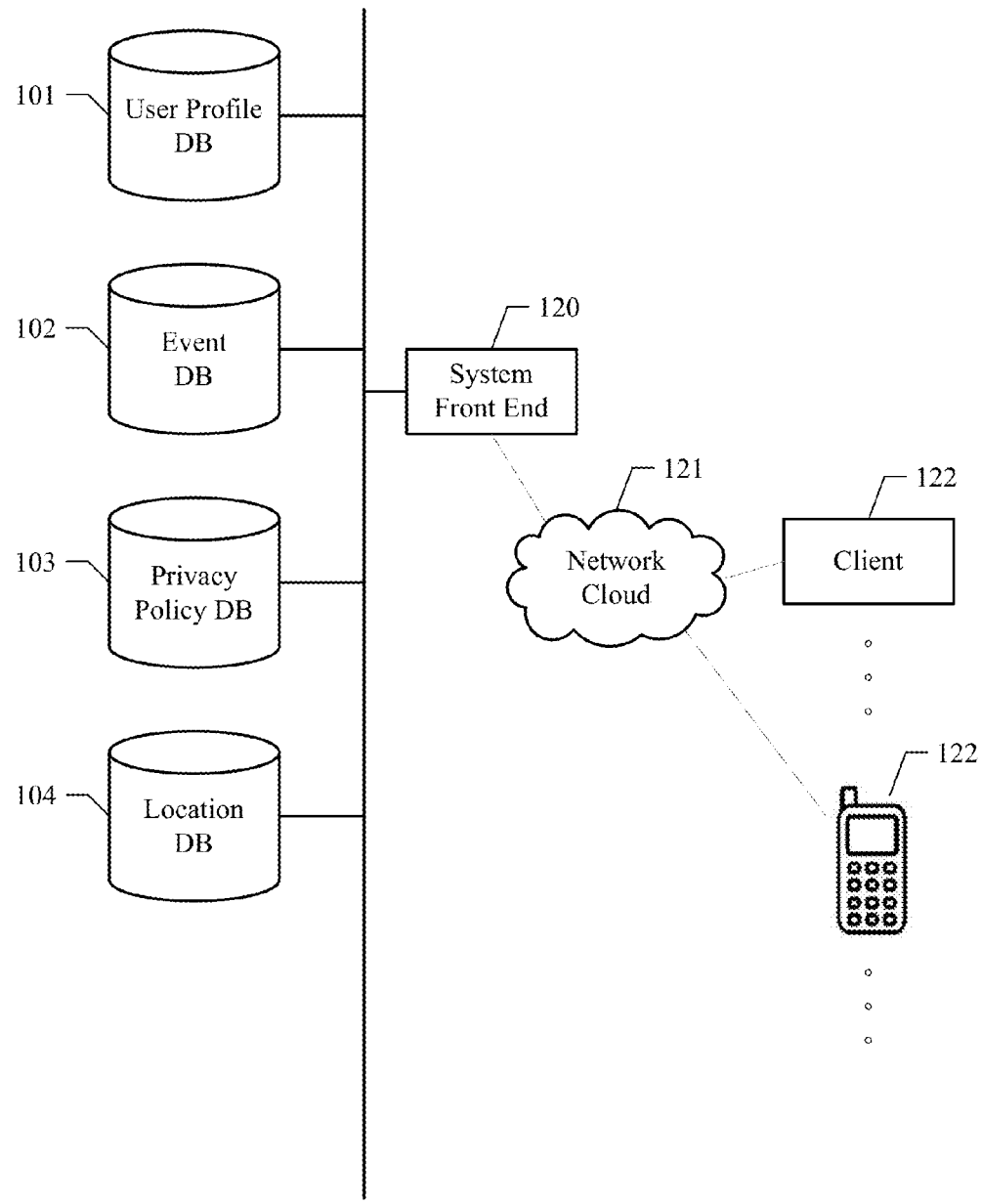
FIG. 1 illustrates an example social networking system.

In the following description, numerous specific details are set forth in order to provide a thorough understanding of the present disclosure. It will be apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Particular embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile as well.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or friends or contacts of the user may also perform activities that affect or cause updates to a user's profile. For example, a contact may add the user as a friend (or remove the user as a friend). A contact may also write messages to the user's profile pages—colloquially known as wall-posts. A user may also input status messages that get posted to the user's profile page.

A social network system may maintain social graph information, which may generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars, and events. For example, the social networking system may also include media sharing capabilities. For example, the social networking system may allow users to post photographs and other multimedia files to a user's profile, such as in a wall post or in a photo album, both of which may be accessible to other users of the social networking system. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations, and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connection, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports, and the like. Some places may correspond to larger regions that themselves contain places—such as a restaurant or a gate location in an airport. In one implementation, each place can be maintained as a hub node in a social graph or other data structure maintained by the social networking system. Social networking system may allow users to access information regarding each place using a client application (e.g., a browser) hosted by a wired or wireless station, such as a laptop, desktop, or mobile device. For example, social networking system may serve web pages (or other structured documents) to users that request information about a place. In addition to user profile and place information, the social networking system may maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate these locations to other users. A check-in to a given place may occur when a user is physically located at the place and, using a mobile device, accesses the geo-social networking system to register the user's presence at the place. A user may select a place from a list of existing places near to the user's current location or may create a new place. The user may also provide comments in a text string when checking in to a given place. The user may also identify one or more other users in connection with a check-in (such as friends of a user) and associate them with the check-in as well. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. The check-in activity may also be displayed on a user profile page and in news feeds provided to users of the social networking system.

Still further, a special purpose client application hosted on a mobile device of a user may be configured to continuously record location data of the mobile device and send the location data to social networking system. In this manner, the social networking system may be aware of the user's location and provide various recommendations to the user related to places that are proximal to the user's path or that are frequented by the user. In one implementation, a user may opt in to this recommendation service, which causes the client application to periodically post location data of the user to the social networking system.

However, absent an explicit statement of location from a user, such as a check-in, or a device that transmits location data to the social networking system, conventional social networking systems cannot accurately estimate the location of a particular user. Thus, a user wishing to append location data to a piece of content, such as a status message, photo, photo album, video, and the like, must either enable location tagging on his or her mobile device, or explicitly identify his or her location. Such operations are time-consuming and degrade the user experience.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location, causing the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet-connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device. In particular embodiments, the social networking system may calculate one or more routes of a user based on the user's profile information, check-in activities, and/or geographic location data reported by a client application (described above) and store the one or more routes in location database 104. For example, the social networking system can calculate a "commute route" of a user between the user's home and work (as described in the user's profile information stored in user profile database 101) by using a mapping service application such as Google Maps, or by using geographic location data points from the user's GPS-equipped mobile phone while the user is driving to work. Particular embodiments herein describe methods of estimating the geographic location of a user of the social networking system from implicit factors.

Figure 2:
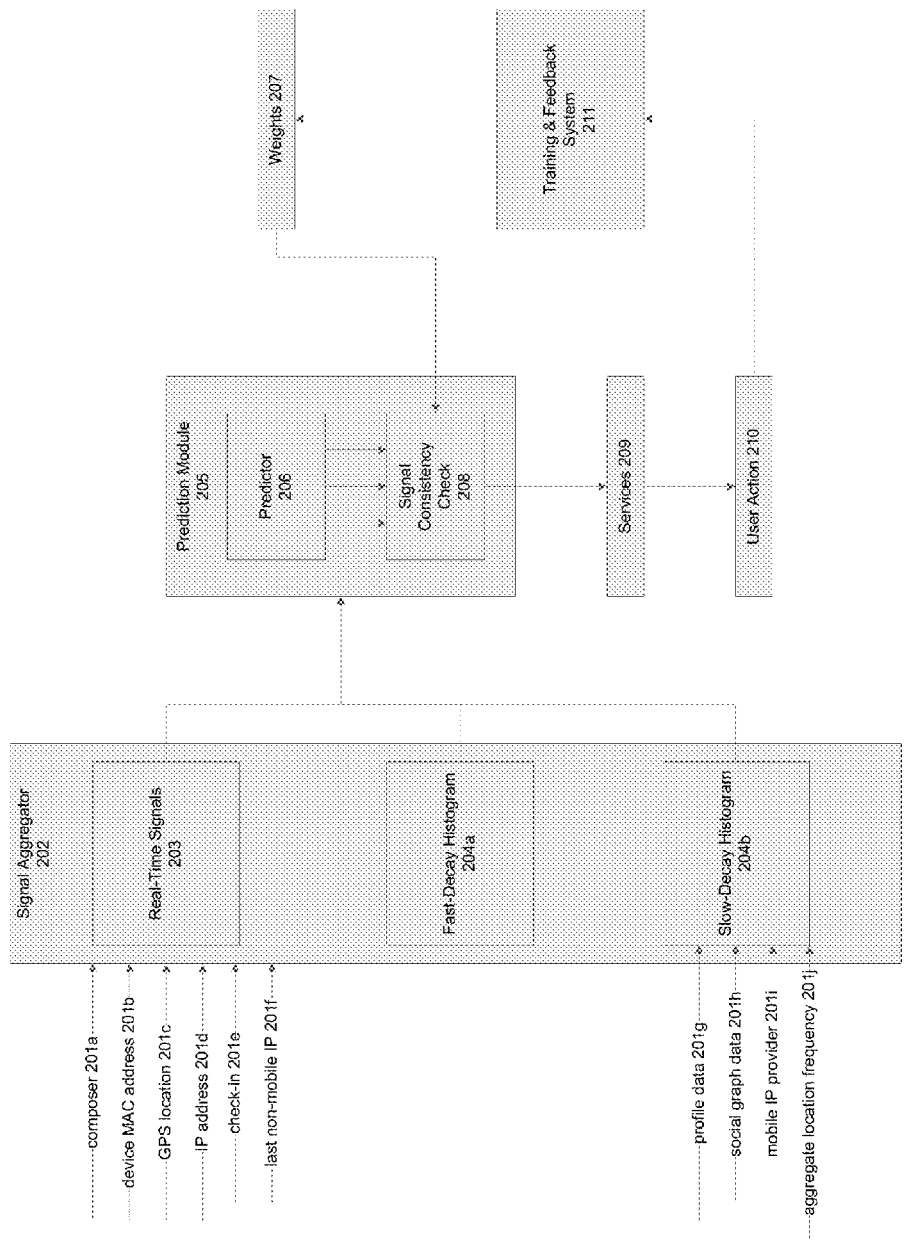
FIG. 2 illustrates an example system for the implicit geolocation of users of a social networking system.

FIG. 2 illustrates an example system for estimating the geographic location of a user of a social networking system from implicit factors. In the example of FIG. 2, social networking system front end 120 may receive a plurality of raw signals 201*a-j*. In particular embodiments, raw signals are generated any time a particular user interacts with the social networking system. For example, whenever a user logs in to the social networking system, the social networking system may use the user's IP address 201*d* as an indicator of the user's location. In particular embodiments, the social networking system may utilize third-parties to map IP addresses to geographic locations. In particular embodiments, the social networking system may connect to IP address databases or regional Internet registries.

Figure 5:
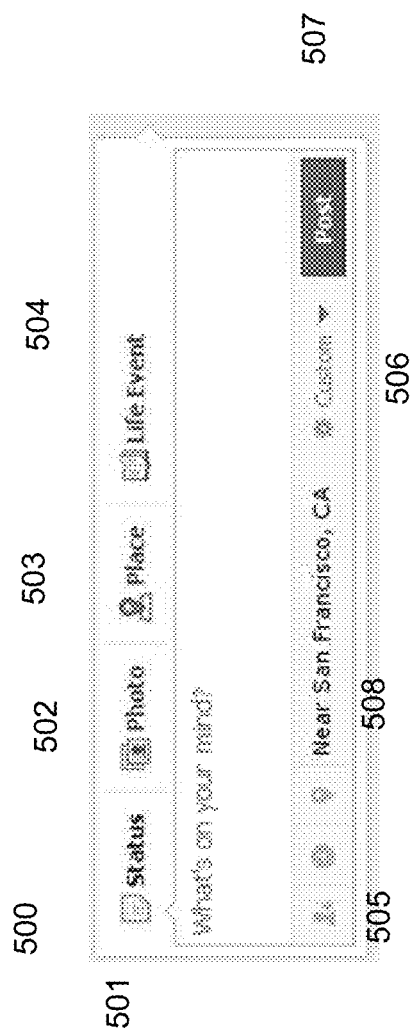
FIG. 5 illustrates an example service utilizing an implicit location estimate.

In the example of FIG. 2, particular services 209 may request location predictions passed from prediction module 205. For example, the "composer" service, which allows users to update their status messages with freeform text, may request a predicted location of the user, so that the user does not have to manually enter a location or check-in to a location. FIG. 5 illustrates an example graphical user interface 500 from the composer service. In FIG. 5, user interface 500 includes a plurality of user-selectable elements to update a user's status 501, upload a photo 502, check-in to a location 503, or add a life event 504. User interface 500 may also include an option to tag other users of the social networking system 505, limit the privacy of the post 506, and post the update 507. In particular embodiments, user interface 500 may include predicted location 508. In the example of FIG. 5, composer service, upon receiving a predicted location from prediction module 205 that the user is in the vicinity of the city of San Francisco, may automatically append "Near San Francisco, Calif." to content generated by the user.

In particular embodiments, prediction module 205 keeps a history of previous location signals pertaining to a particular user. The location history is a set of location signals about the particular user received over a period of time. To estimate the user's current location, prediction module 205 may take a weighted average of one or more location predictions based on real-time signals 203, one or more location predictions based on a fast-decay histogram 204a, and one or more location predictions based on slow-decay histogram 204b. The weights 207 utilized in the weighted average may be determined, in particular embodiments, by a machine learning algorithm trained through user feedback system 211.

Raw signals 210a-j may be initially classified as real-time signals 203, or signals for aggregation in fast-decay histogram 204a or slow-decay histogram 204b. In particular embodiments signals received by the social networking system during the same session as the request for an estimated location from a service may be considered a "real-time signal" 203. In particular embodiments, a session may span the length of time that a user is logged into the social networking system. In yet other embodiments, a session may span a length of time less than the amount of time that a user is logged into the social networking system, e.g., a predetermined amount of time or a dynamically-determined amount of time corresponding to a user's activity in the social-networking system. For example, if a user logs in to the social networking system from a particular IP address, and accesses, during the same session, a page including the composer service, prediction module 205 may consider the IP address raw signal and the request from service 209 to have occurred substantially simultaneously. In particular embodiments, signals received by the social networking system within a particular amount of time from the request by a service 209 may be considered "real-time signals" 203. For example, if a user on a mobile device transmits its location based on GPS processing at 12 noon, and then accesses a page including the composer service at 12:01 PM, prediction module 205 may treat the GPS location signal as a real-time signal 203. As yet another example, a user may self-update location information via a check-in 201e at 4 PM. If the user views a page including a service 209 that requests a location update at, for example, 4:10 PM, prediction module may consider check-in 201e as a real-time signal 203.

Real time signals, for example, the MAC address 201b of the device the user has logged in from, GPS location 201c reported by the user's mobile device, and the IP address 201d are generally extremely indicative of the user's geographic location at the instant the signal is received. However, real-time signals 203 are accurate for only a brief period of time; they become "stale" very quickly. For example, if a user travels to a particular city and his or her mobile device transmits its self-determined GPS location 201c to the social networking system, the social networking system cannot assume that the user's location is GPS location 201c even thirty minutes later. For example, the user may have interacted with the social networking system from an airport and boarded a flight shortly thereafter. In this sense, the value of real-time signals 203 decays extremely rapidly. In particular embodiments, if a service 209 requests a location estimate from location prediction module 205, real-time signals 203 are given a higher emphasis, or weight, the smaller the temporal distance between the time of the request from service 209 and the time the real-time signal 202 was received. Although the example system of FIG. 2 depicts a set of particular real-time signals, any suitable signal containing implicit or explicit location data may be weighted as a real-time signal.

In particular embodiments, some or all signals are aggregated in one of the two histograms 204a or 204b. Signal aggregator 202 may maintain one or more location histograms 204a and 204b to preserve previous location data from users for making location predictions. For example, if a user checks-in to the Eiffel Tower, and, while still logged into the social networking system, accesses a page containing a service 209 requesting an estimated location (for example, the composer service), the check-in will be considered a real-time signal 203. In the same example, if the user accesses the composer application immediately after checking-in, all his or her content will include the text "Near Paris, France." After the user logs out, the Eiffel Tower check-in may be stored as a data point in fast-decay histogram 204a. For example, if the user accesses a page including the composer service the next day, the Eiffel Tower check-in will be contained in fast-decay histogram 204a. Similarly, if the user accesses a page including the composer service two weeks later, the Eiffel Tower check-in may be contained in slow-decay histogram 204b as part of a set of aggregated location data. This disclosure contemplates any suitable time duration for categorizing signals in fast or slow decay histograms 204a or b. Although this disclosure describes two histograms, this disclosure contemplates any suitable number of histograms.

In particular embodiments, location histograms 204a and 204b store locations at a very coarse level, such as the nearest city, in order to protect the privacy of users of the social networking system. For example, instead of storing the GPS longitude and latitude coordinates transmitted by a user's mobile device, histograms 204a and 204b may only store that the user is in the city of San Francisco. As another example, instead of storing the user's IP address, histograms 204a and 204b may merely store the city or geographic area associated with the IP address range; for example, "San Jose, Calif." Thus, in particular embodiments, user privacy is preserved through coarse location history storage.

In particular embodiments, the social networking system may maintain a log of MAC addresses for each device used by a particular user to log-in to the social networking system. In particular embodiments, each MAC address may be associated with a particular geographic location. In particular embodiments, machine learning is utilized to differentiate between MAC addresses for devices that are mobile, and MAC addresses that are roughly static. For example, if a particular MAC address appears in multiple geographic locations, it is likely that the device is mobile, such as a mobile phone or a laptop. Conversely, if a MAC address for a particular device is always associated with a particular geographic location, the device may be assumed to be generally immobile, such as a desktop computer. In particular embodiments, immobile device MACs may be cross-referenced against other users' MAC address list to identify shared computers, such as at public libraries or universities. In particular embodiments, a third-party MAC device database may be utilized. MAC addresses generally follow a specific encoding method; particular bytes may represent the device manufacturer and device type. In particular embodiments, the social networking system may determine whether a MAC address is for a mobile device, such as a laptop Wi-Fi chip, or for a immobile device, such as a PCI-based Ethernet network interface card (NIC). This disclosure contemplates any suitable method of associating a MAC address with a particular geographic location.

In particular embodiments, slow decay histogram 204b may include aggregate location data 201j, such as the total amount of time spent in a particular location. For example, slow-decay histogram may keep a running sum of signals indicating a particular city, in order to determine what city the user has spent the most amount of aggregate time in. However, such aggregate location statistics 201j are not particularly helpful for predicting a current location. For example, a user may have lived in Chicago for five years, then moved to Los Angeles. Based on aggregate location statistics 201j, the social networking system would assume that the user is still in Chicago. Thus, in particular embodiments, once data stored in fast-decay histogram 204a has gone stale, it is completely discarded.

In particular embodiments, slow-decay histogram 204b includes a number of predefined signals. For example, profile data signals 201g comprise location information pulled from a user's profile page, such as the user's hometown or current city. In particular embodiments, other information such as the user's school or employer may be used as a location signal in slow-decay histogram 204b. In particular embodiments, the user's listed home phone number area code may be used as a location signal in slow-decay histogram 204b. In particular embodiments, social graph data signals 201h may be pulled from the social networking system social graph. For example, the social networking system may take into account where the user's friends are located. As another example, the social networking system may take into account where the user's family or significant other is located. In particular embodiments, the social networking system may take into account the location of users with which the particular user interacts with the most on the social networking system. This disclosure contemplates the use of any data available in the user's profile or from the social graph as location signals for slow-decay histogram 204b.

In particular embodiments, the user's mobile IP provider's IP address may be utilized as a location signal in slow-decay histogram 204b. For example, a user may access the social networking system from a device that utilizes mobile IP. As commonly known in the art, mobile IP employs a home agent that forwards packets to the user's device regardless of where the user travels; thus the user maintains the same IP address (the home agent IP address). While the use of a home agent may corrupt fast-decay histograms, the home agent IP address may be leveraged as a signal for slow-decay histogram 204b. In particular embodiments, mobile IP addresses are not logged in fast-decay histogram 204a. This disclosure contemplates any suitable means of differentiating between a mobile IP address and non-mobile IP address, and any suitable treatment of location signals derived from the mobile IP address.

As previously described, each of real-time signals 203, fast decay histogram 204a, and slow-decay histogram 204b may be processed by prediction module 205. In particular embodiments, predictor 206 outputs a plurality of candidate locations. In particular embodiments, processing of real-time signals 203 and fast-decay histogram 204a may indicate the user is at a single city, whereas analysis of slow-decay histogram 204b may output the top five cities and their scores. Predictor 206 passes a plurality of candidate locations to signal consistency check 208.

Signal consistency check 208 eliminates predictions based on a number of factors. In particular embodiments, signal consistency check 208 eliminates predictions that fall outside a particular range based on real-time signals 203. For example, if a user's IP address (one possible type of real-time signal 203) indicates that he or she is in Paris, France, and a particular location prediction indicates that the user is outside of a circle of predetermined radius (e.g., 400 miles) centered in Paris, the inconsistent prediction may be eliminated. In particular embodiments, location predictions inconsistent with explicit user location declarations are eliminated; that is, the social networking system will always take the users' word, despite other signals indicating otherwise. For example, if a user's IP address (either from real-time signals or one of the fast or slow-decay histograms) indicates that a user is logged in from an IP address range associated with the Austin, Tex. area, but the user checks in to a Starbucks in Palo Alto, Calif., the inconsistent location predictions are eliminated. In particular cases, this may be due to the fact the user may be accessing the social networking system (or entire Internet) via a remote data center or through a web proxy that corrupts the integrity of the location prediction.

In particular embodiments, a karma score may be calculated for each user that tags or checks-in another user to a particular location. In such embodiments, the karma score may reflect the difference in the user's explicit location declaration for another user, and location predictions for the other user. If the explicit location declaration for the other user is inconsistent with the other user's actual location, the karma score for the declaring user decreases. Explicit location declarations for other users by users having low karma scores may be eliminated or weighted very lowly. Thus, a user who often falsely checks-in users to other locations will lose creditability to the social networking system, and his or her declarations will be relied upon less and less by prediction module 205.

Upon eliminating inconsistent signals via signal consistency check 208, prediction module 205 may calculate a single location prediction. In particular embodiments, the single location prediction is reached by taking a weighted average of the real-time signal location prediction or predictions, one or more predictions obtained from the slow-decay histogram, and one or more predictions obtained from the fast-decay histogram. In particular embodiments, the weights 207 utilized in the weighted average are subject to a training or feedback mechanism. After the single location prediction is calculated, it is delivered to the requesting service 209.

Training and feedback mechanism 211 may, in particular embodiments, adjust weights 207 based on received user actions 210. For example, if a user decides to use a location prediction in a status update in composer, training and feedback system 211 may interpret this action as a "positive" user action, and keep weights 207 at their current level. As another example, if the user decides to overwrite or correct the predicted location, training and feedback system 211 may interpret this action as "negative" user action, and adjust weights 207 accordingly. This disclosure contemplates any suitable means of adjusting weights 207 in response to user feedback.

Figure 3:
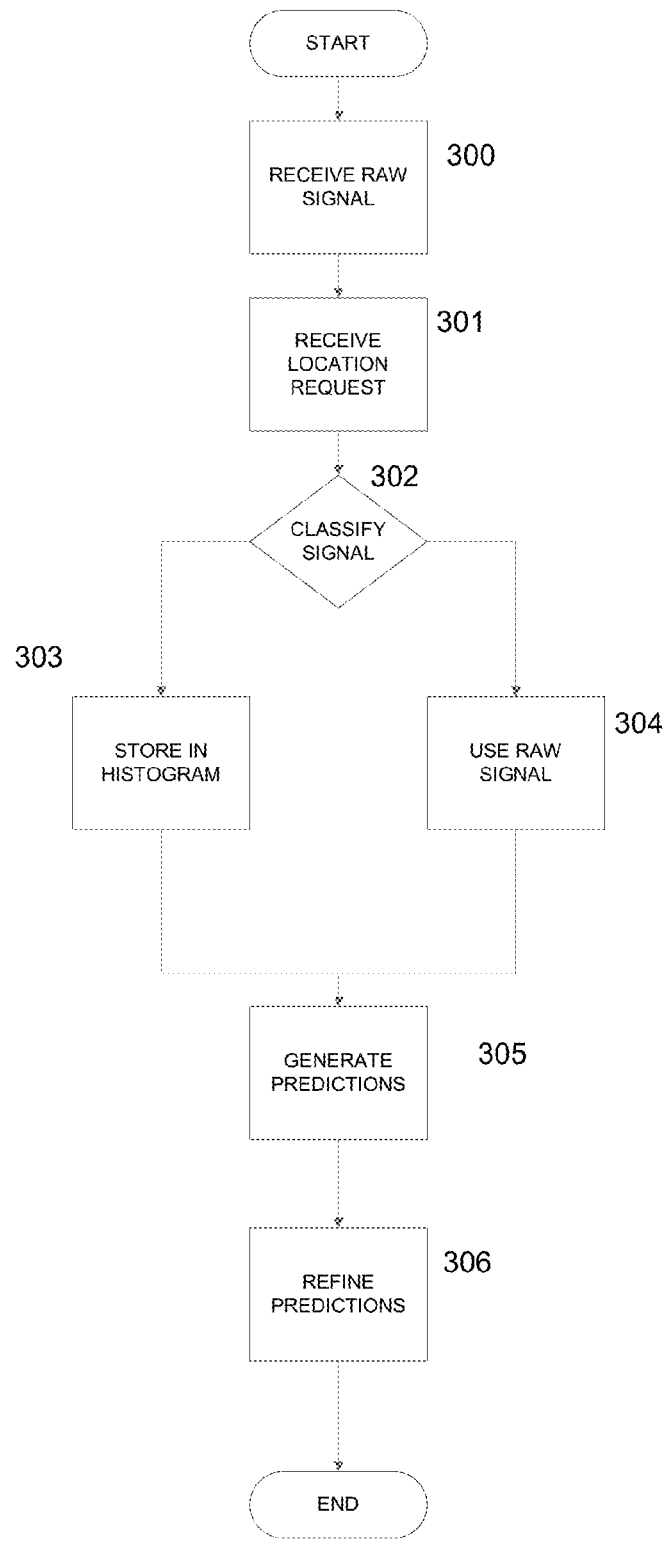
FIG. 3 illustrates an example method for generating a location prediction for a particular user.

FIG. 3 illustrates an example method for generating a location prediction upon receiving a raw signal. At step 300, the social networking system receives a raw signal. As previously disclosed, raw signals may be any of the signals described in FIG. 2, including but not limited to IP address, a check-in, GPS location information, and the like.

At Step 301, location predictor module 205 receives a request from one or more services 209. As previously discussed, services 209 may include the composer application, that suggests locations for status updates. In other embodiments, services 209 may include the check-in application, that suggests points of interest or places close to the predicted location of the user. In other embodiments, services 209 may include the photo album application, which suggests locations for the user to assign to particular photo albums. This disclosure contemplates any number of applications requesting location predictions.

At Step 302, location prediction module 205 classifies the raw signal as a real-time signal for immediate processing, or a signal to be stored in one of the one or more location histograms. In particular embodiments, the determination as to whether to treat a signal as a real-time signal depends on the amount of time that has elapsed between receiving the signal at step 300 and the time of receiving the request at Step 301. For example, if prediction module 205 receives a check-in, and receives a location request under five minutes later, prediction module 205 may treat the check-in as a "real-time signal." In particular embodiments, signals received during the same session as the request may be treated as a real-time signal.

If a signal is to be treated as a real-time signal, it is classified at Step 303 as a real-time signal. If the signal is not classified as a real-time signal, then at Step 304 it is stored in one or more of the location histograms. As previously disclosed, the time between the signal reception and the location request may be used as one factor in determining whether to store the signal in fast-decay or slow-decay histograms. As previously disclosed, the type of signal may be used as a factor in choosing whether to store the signal in a fast-decay or slow decay histogram. This disclosure contemplates any suitable method of sorting signals for storing in slow or fast-decay histograms.

At Step 305, predictor module 205 obtains one or more predictions from one or more of the real-time signals, fast decay histogram, and slow-decay histogram. In particular embodiments, predictor module 205 may simply take the X highest scored locations from one or more (or each) of the histograms. This disclosure contemplates any suitable method of obtaining locations from location histograms. At Step 306, predictor module 205 refines the location predictions by eliminating inconsistent location predictions via signal consistency check 208 as previously disclosed. Additionally, at Step 306, predictor module generates a single location prediction for delivery to the requesting service. In particular embodiments, as previously disclosed, the single location prediction is generated by calculating a weighted average of the location predictions using weights 207 obtained through machine learning. This disclosure contemplates any suitable means of generating weights 207, such as, for example, through the use of a neural network.

Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
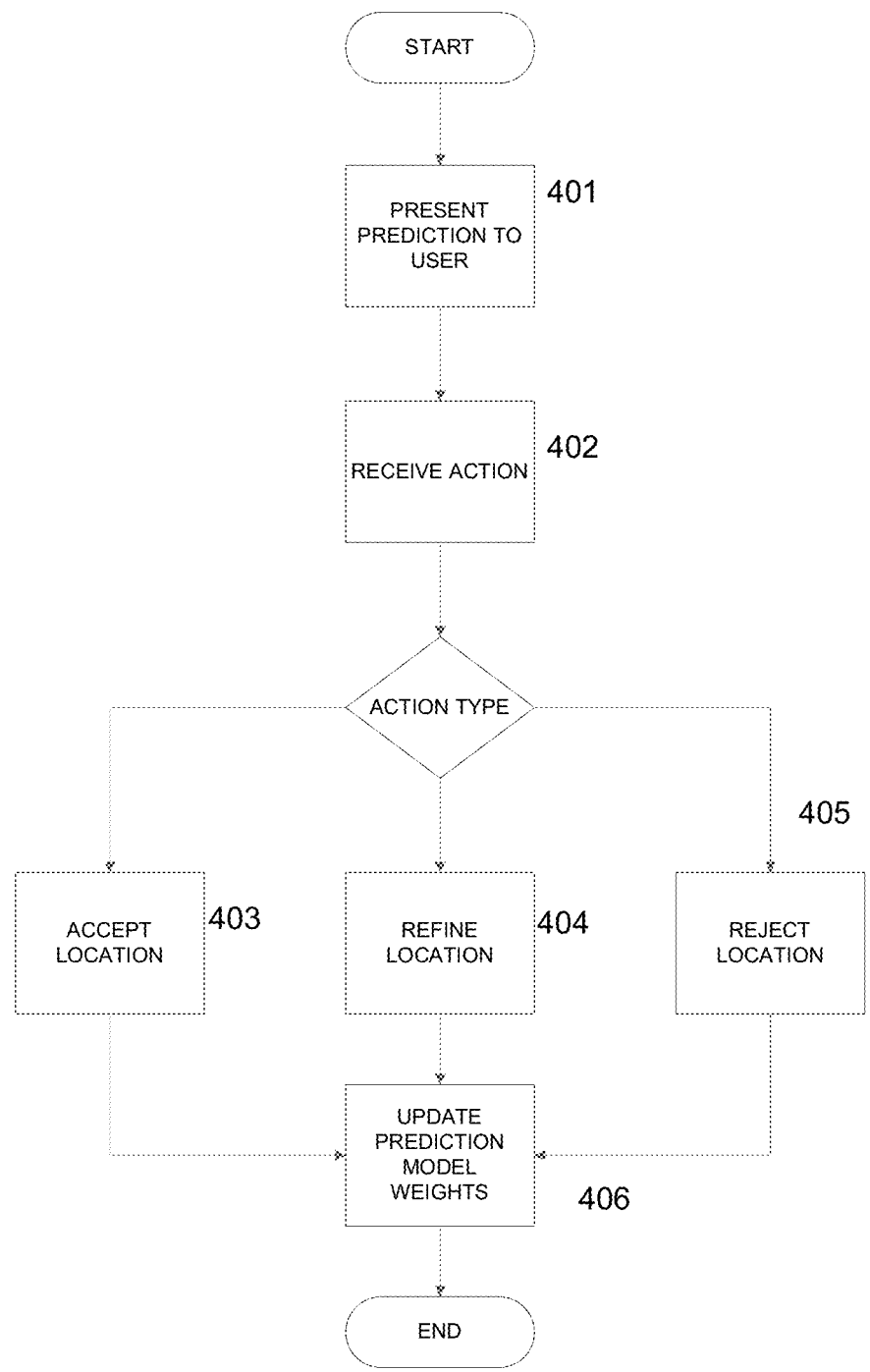
FIG. 4 illustrates an example method for adjusting the weights of a prediction model based on user feedback.

FIG. 4 illustrates an example method for training or adjusting weights 207 based on user actions 210. In FIG. 4, the process may begin at Step 401, where requesting service 209 presents the location prediction received from predictor module 205 to the user. As previously disclosed, the predicted location may be presented via a graphical user interface, as discussed with reference to FIG. 5.

At Step 402, service 209 may receive one or more actions from the user. In particular embodiments, the received action is passed from service 209 to training and feedback system 211. In particular embodiments, the received action is passed from service 209 to predictor module 205. This disclosure contemplates any suitable arrangement of hardware or software components for processing user actions.

Various action types may be classified as positive or negative examples. For example, if the user accepts the predicted location at Step 403, the example may be classified as positive, and the weights may not be modified. As another example, at Step 404, if the user refines the location, the example may be classified as positive or negative, and the weights may be adjusted accordingly. For example, if the slow decay histogram has a particular weight and predicts that the user's location is San Francisco, Calif., whereas the fast-decay histogram has a particular weight and predicts that the user's location is in San Jose, Calif., and the user corrects the predicted location from San Francisco, Calif. to San Jose, Calif., training and feedback system 211 may adjust weights 207 such that the fast-decay histogram is given a higher weight. If the user simply rejects the location by closing the location prediction window or opting not to show the location, training and feedback system 211 may consider the example to be a "negative" example. At Step 406, training and feedback system 211 adjusts weights 207 in response to the received user action.

Figure 6:
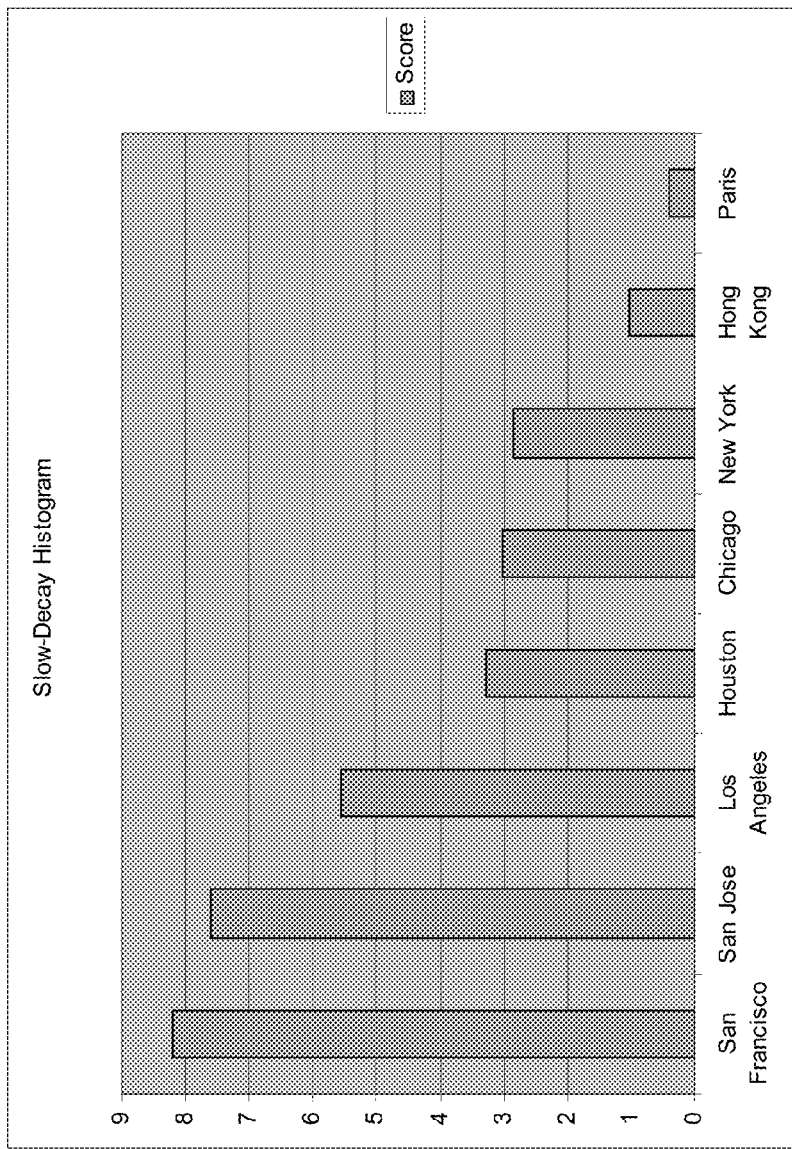
FIG. 6 illustrates an example slow-decay histogram.

FIG. 6 illustrates an example slow-decay histogram. In FIG. 6, particular coarse locations, such as geographic regions or cities, are displayed across the x axis, and the calculated score for each location is plotted on the Y axis. In particular embodiments, each signal is assigned a particular value, and the Y axis is the sum of all the values for that particular location. In particular embodiments, all signals are assigned the same value. In particular embodiments, particular signals, such as information gleaned from the user's profile, may be assigned a higher value. In particular embodiments, the value may decrease with the age of the signal. Thus, a slow decay histogram may have a plurality of signals that decay at different rates. This disclosure contemplates any suitable means for calculating scores for slow-decay histograms.

Figure 7:
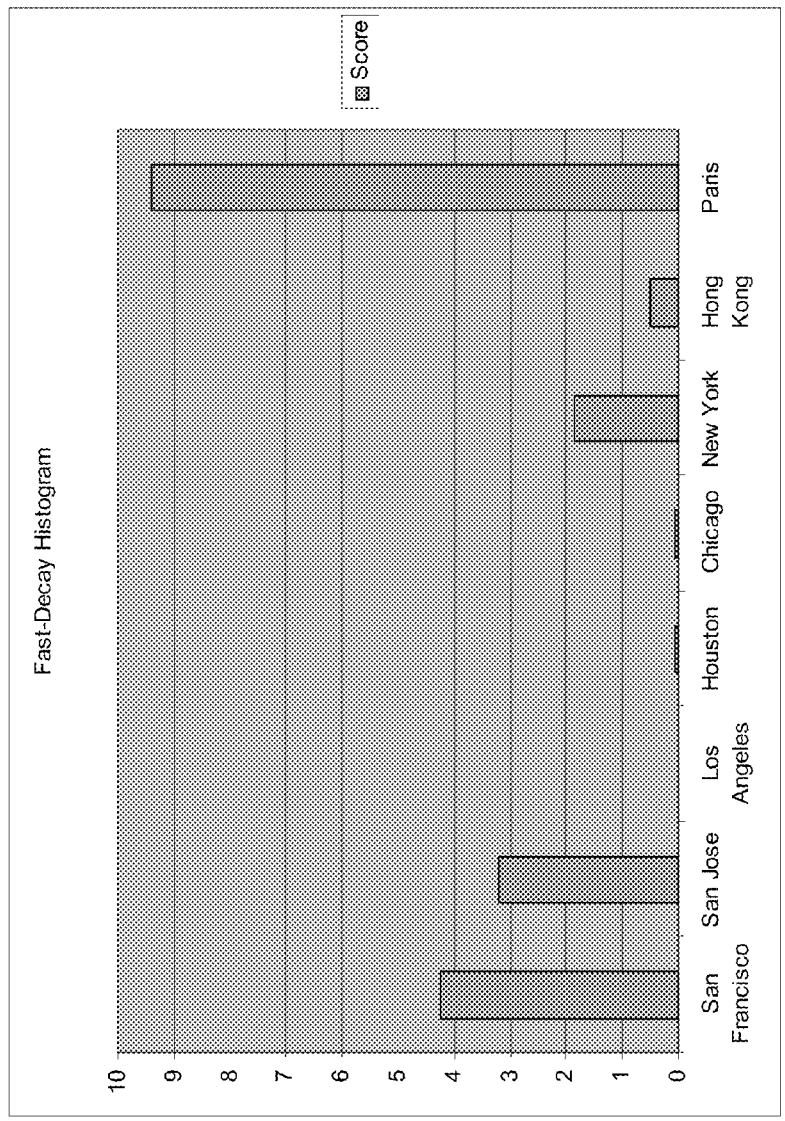
FIG. 7 illustrates an example fast-decay histogram.

FIG. 7 illustrates an example fast-decay histogram. In FIG. 7, particular coarse locations, such as geographic regions or cities, are plotted across the x-axis, and the calculated score for each location is plotted on the Y-axis. In particular embodiments, each signal is assigned a particular value, and the Y axis is the sum of all the values for that particular location. In particular embodiments, all signals are assigned the same value. In particular embodiments, particular signals, such as IP address or GPS location, are assigned higher values. In FIG. 6, slow-decay histogram indicates that San Francisco and San Jose are the most probable locations of the user, with Paris, France being the lowest probability city. In such an example, it may be possible that the user is based out of the San Francisco bay area, but is traveling to Paris. Thus, the total aggregate amount of location signals indicating Paris as the user's current location may be extremely small, but, as seen in FIG. 7, the fast decay histogram points to the user being in Paris. In such an embodiment, the fast-decay histogram may be weighted higher, and the estimated location may be Paris, France for a predetermined amount of time until the signals in the fast-decay histogram decay.

Figure 8:
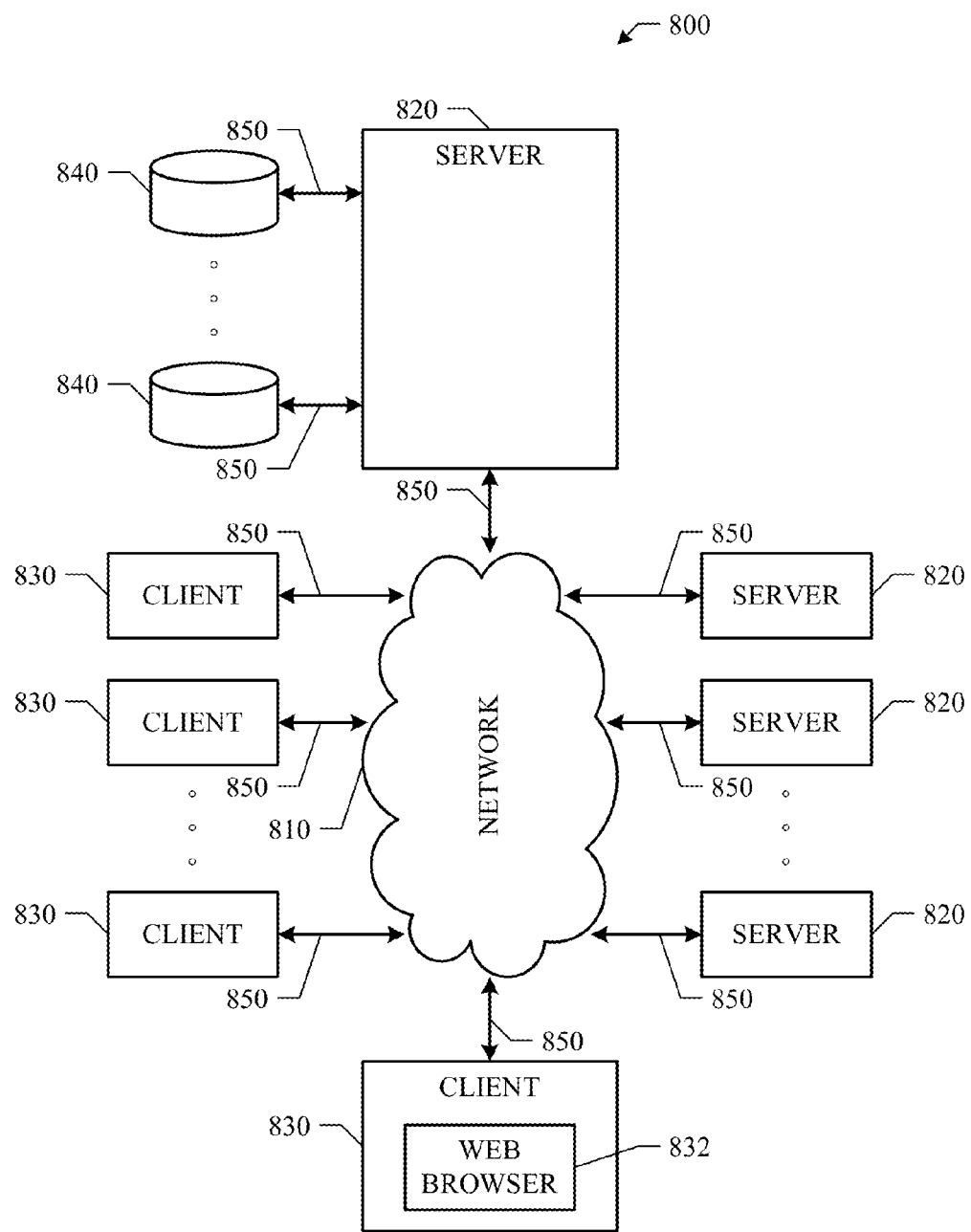
FIG. 8 illustrates an example networking environment.

While the foregoing embodiments may be implemented in a variety of network configurations, the following illustrates an example network environment for didactic, and not limiting, purposes. FIG. 8 illustrates an example network environment 800. Network environment 800 includes a network 810 coupling one or more servers 820 and one or more clients 830 to each other. Network environment 800 also includes one or more data storage 840 linked to one or more servers 820. Particular embodiments may be implemented in network environment 800. For example, social networking system frontend 120 may be written in software programs hosted by one or more servers 820. For example, event database 102 may be stored in one or more storage 840. In particular embodiments, network 810 is an intranet, an extranet, a virtual private network (VPN), a local area network (LAN), a wireless LAN (WLAN), a wide area network (WAN), a metropolitan area network (MAN), a portion of the Internet, or another network 810 or a combination of two or more such networks 810. The present disclosure contemplates any suitable network 810.

One or more links 850 couple a server 820 or a client 830 to network 810. In particular embodiments, one or more links 850 each includes one or more wired, wireless, or optical links 850. In particular embodiments, one or more links 850 each includes an intranet, an extranet, a VPN, a LAN, a WLAN, a WAN, a MAN, a portion of the Internet, or another link 850 or a combination of two or more such links 850. The present disclosure contemplates any suitable links 850 coupling servers 820 and clients 830 to network 810.

In particular embodiments, each server 820 may be a unitary server or may be a distributed server spanning multiple computers or multiple datacenters. Servers 820 may be of various types, such as, for example and without limitation, web server, news server, mail server, message server, advertising server, file server, application server, exchange server, database server, or proxy server. In particular embodiments, each server 820 may include hardware, software, or embedded logic components or a combination of two or more such components for carrying out the appropriate functionalities implemented or supported by server 820. For example, a web server is generally capable of hosting websites containing web pages or particular elements of web pages. More specifically, a web server may host HTML files or other file types, or may dynamically create or constitute files upon a request, and communicate them to clients 830 in response to HTTP or other requests from clients 830. A mail server is generally capable of providing electronic mail services to various clients 830. A database server is generally capable of providing an interface for managing data stored in one or more data stores.

In particular embodiments, one or more data storages 840 may be communicatively linked to one or more servers 820 via one or more links 850. In particular embodiments, data storages 840 may be used to store various types of information. In particular embodiments, the information stored in data storages 840 may be organized according to specific data structures. In particular embodiment, each data storage 840 may be a relational database. Particular embodiments may provide interfaces that enable servers 820 or clients 830 to manage, e.g., retrieve, modify, add, or delete, the information stored in data storage 840.

In particular embodiments, each client 830 may be an electronic device including hardware, software, or embedded logic components or a combination of two or more such components and capable of carrying out the appropriate functions implemented or supported by client 830. For example and without limitation, a client 830 may be a desktop computer system, a notebook computer system, a netbook computer system, a handheld electronic device, or a mobile telephone. The present disclosure contemplates any suitable clients 830. A client 830 may enable a network user at client 830 to access network 830. A client 830 may enable its user to communicate with other users at other clients 830.

A client 830 may have a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 830 may enter a Uniform Resource Locator (URL) or other address directing the web browser 832 to a server 820, and the web browser 832 may generate a Hyper Text Transfer Protocol (HTTP) request and communicate the HTTP request to server 820. Server 820 may accept the HTTP request and communicate to client 830 one or more Hyper Text Markup Language (HTML) files responsive to the HTTP request. Client 830 may render a web page based on the HTML files from server 820 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 9:
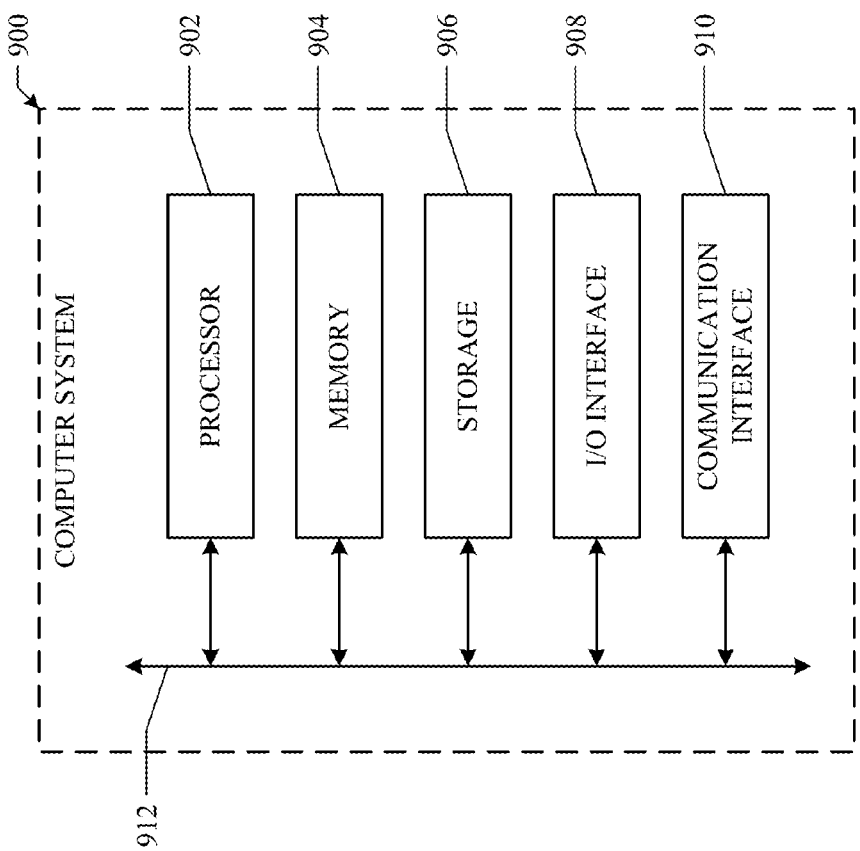
FIG. 9 illustrates an example computing system.

Particular embodiments may be implemented on one or more computer systems. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, or any other suitable computer-readable storage medium or media), or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:

receiving, from a service, a request for a location prediction for a user;

accessing one or more real-time location signals, received within a predetermined time span from a time that the request for the location prediction was received from the service, and one or more aggregated location signals, each comprising one or more previous location signals, received before the predetermined time span;

generating a plurality of current location predictions from the one or more real-time location signals and the one or more aggregated location signals;

calculating a single location prediction for the user from the plurality of current location predictions; and sending, in response to the request, the single location prediction for the user to the requesting service.

2. The method of claim 1, wherein the one or more real-time location signals comprise the user's last IP address.

3. The method of claim 1, wherein the one or more real-time location signals comprise a self-declared user location.

4. The method of claim 1, wherein the one or more real-time location signals comprise location signals received during a same session as the location prediction request from the service.

5. The method of claim 1, wherein the one or more aggregated location signals comprise a fast-decay histogram and a slow decay histogram, and wherein the fast-decay histogram comprises received location signals of a first type, and the slow-decay histogram comprises received location signals of a second type.

6. The method of claim 1, further comprising:

filtering the plurality of location predictions based on a set of rules, wherein the set of rules comprises filtering out location predictions that exceed a predetermined geographic radius from a location associated with the user's IP address.

7. The method of claim 1, the calculating a single location prediction comprising calculating a weighted average for the plurality of location predictions, wherein a weight of each prediction is based at least in part on a source of signals from which the prediction was generated.

8. The method of claim 7, wherein the source of the signals comprises real-time signals, a fast-decay histogram, and a slow-decay histogram, and wherein the weight for each source is determined via a machine learning algorithm.

9. One or more computer-readable non-transitory storage media in one or more computing systems, the media embodying logic that is operable when executed to:
receive, from a service, a request for a location prediction for a user;
access one or more real-time location signals, received within a predetermined time span from a time that the request for the location prediction was received from the service, and one or more aggregated location signals, each comprising one or more previous location signals received before the predetermined time span;
generate a plurality of current location predictions from the one or more real-time location signals and the one or more aggregated location signals;
calculate a single location prediction for the user from the plurality of current location predictions; and
send, in response to the request, the single location prediction for the user to the requesting service.

10. The media of claim 9, wherein the one or more real-time location signals comprise the user's last IP address.

11. The media of claim 9, wherein the one or more real-time location signals comprise a self-declared user location.

12. The media of claim 9, wherein the one or more real-time location signals comprise location signals received during a same session as the location prediction request from the service.

13. The media of claim 9, wherein the one or more aggregated location signals comprise a fast-decay histogram and a slow decay histogram, and wherein the fast-decay histogram comprises received location signals of a first type, and the slow-decay histogram comprises received location signals of a second type.

14. The media of claim 9, the calculating a single location prediction comprising calculating a weighted average for the plurality of location predictions, wherein a weight of each prediction is based at least in part on a source of signals from which the prediction was generated.

15. The media of claim 9, wherein the media further embodies logic that is operable to:
filter the plurality of location predictions based on a set of rules, wherein the set of rules comprises filtering out location predictions that exceed a predetermined geographic radius from a location associated with the user's IP address.

16. A system comprising:
one or more processors; and
a memory coupled to the processors comprising instructions executable by the processors, the processors being operable when executing the instructions to:
receive, from a service, a request for a location prediction for a user;
access one or more real-time location signals, received within a predetermined time span from a time that the request for the location prediction was received from the service, and one or more aggregated location signals, each comprising one or more previous location signals received before the predetermined time span;
generate a plurality of current location predictions from the one or more real-time location signals and the one or more aggregated location signals;
calculate a single location prediction for the user from the plurality of current location predictions; and
send, in response to the request, the single location prediction for the user to the requesting service.

17. The system of claim 16, wherein the one or more real-time location signals comprise the user's last IP address.

18. The system of claim 16, wherein the one or more real-time location signals comprise a self-declared user location.

19. The system of claim 16, wherein the one or more real-time location signals comprise location signals received during a same session as the location prediction request from the service.

20. The system of claim 16, wherein the one or more aggregated location signals comprise a fast-decay histogram and a slow decay histogram, and wherein the fast-decay histogram comprises received location signals of a first type, and the slow-decay histogram comprises received location signals of a second type.

21. The system of claim 16, wherein the processors are further operable when executing the instructions to:
filter the plurality of location predictions based on a set of rules, wherein the set of rules comprises filtering out location predictions that exceed a predetermined geographic radius from a location associated with the user's IP address.

22. The system of claim 16, the calculating a single location prediction comprising calculating a weighted average for the plurality of location predictions, wherein a weight of each prediction is based at least in part on a source of signals from which the prediction was generated.

23. The system of claim 16, wherein the source of the signals comprises real-time signals, a fast-decay histogram, and a slow-decay histogram, and wherein the weight for each source is determined via a machine learning algorithm.

* * * * *